United States Patent
Au et al.

(10) Patent No.: US 11,423,348 B2
(45) Date of Patent: Aug. 23, 2022

(54) SYSTEM AND METHOD FOR ASSESSING WORKER PERFORMANCE

(71) Applicant: Hand Held Products, Inc., Fort Mill, SC (US)

(72) Inventors: Kwong Wing Au, Bloomington, MN (US); Christopher L. Lofty, Canonsburg, PA (US); Steven Thomas, Murrysville, PA (US); John Pecorari, Harrison City, PA (US); James Geisler, Pittsburgh, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 1178 days.

(21) Appl. No.: 14/992,187

(22) Filed: Jan. 11, 2016

(65) Prior Publication Data

US 2017/0200108 A1    Jul. 13, 2017

(51) Int. Cl.
*G06Q 10/06*    (2012.01)
*H04L 51/10*    (2022.01)
*H04L 12/18*    (2006.01)

(52) U.S. Cl.
CPC ....... *G06Q 10/06398* (2013.01); *H04L 51/10* (2013.01); *H04L 12/1895* (2013.01)

(58) Field of Classification Search
CPC ........... G06Q 30/0261; G06Q 30/0269; G06Q 10/06398; G06Q 10/1091; G10L 25/57;
(Continued)

(56) References Cited

U.S. PATENT DOCUMENTS 6,832,725 B2    12/2004    Gardiner et al.
7,128,266 B2    10/2006    Zhu et al.
(Continued)

FOREIGN PATENT DOCUMENTS

WO    WO-2005060406 A2 *    7/2005    ....... G06Q 10/06375
WO    WO-2008074008 A2 *    6/2008    .......... B66F 9/07581
(Continued)

OTHER PUBLICATIONS

R. Sharma et al., "Speech-gesture driven multimodal interfaces for crisis management," in Proceedings of the IEEE, vol. 91, No. 9, pp. 1327-1354, Sep. 2003, doi: 10.1109/JPROC.2003.817145. (Year: 2003).*

(Continued)

*Primary Examiner* — Mehmet Yesildag
(74) *Attorney, Agent, or Firm* — Alston & Bird LLP

(57) ABSTRACT

Logistical operations (e.g., warehouses) may use a voice-enabled workflow to facilitate the work tasks of a staff (i.e., population) of workers. Typically, it is necessary for a worker to travel from location-to-location to complete assigned work tasks. As such, a worker's time spent travelling often correlates with the worker's overall work performance. Understanding the worker's travel performance is highly desirable, but computing a fair and accurate travel-performance metric is difficult. One reason for this is that the distance a worker travels is often unknown. The present invention embraces a system and method for accurately and fairly assessing a worker's travel performance by analyzing the worker's voice dialog.

20 Claims, 6 Drawing Sheets

(58) Field of Classification Search
CPC .. G11B 20/00463; G11B 27/031; G11B 27/19
USPC ............... 345/156; 379/266.03; 701/29.1;
705/7.19, 7.25, 7.38; 709/324; 715/700;
718/100; 726/26
See application file for complete search history.

(56) References Cited

U.S. PATENT DOCUMENTS

| | | | |
|---|---|---|---|
| 7,159,783 B2 | 1/2007 | Walczyk et al. | |
| 7,171,365 B2 * | 1/2007 | Cooper | G04G 21/06 704/231 |
| 7,413,127 B2 | 8/2008 | Ehrhart et al. | |
| 7,664,638 B2 * | 2/2010 | Cooper | G04G 21/06 704/231 |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |

(56) References Cited

U.S. PATENT DOCUMENTS

| | | |
|---|---|---|
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,917,861 B2* | 12/2014 | Clayton .............. H04M 3/5233 379/265.12 |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,218,814 B2* | 12/2015 | Xiong .................... G10L 15/22 |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey |
| 9,342,827 B2 | 5/2016 | Smith |
| 9,355,294 B2 | 5/2016 | Smith et al. |
| 9,361,882 B2* | 6/2016 | Ressler .................. G10L 13/04 |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van Horn et al. |
| 9,418,252 B2 | 8/2016 | Nahill et al. |
| D766,244 S | 9/2016 | Zhou et al. |
| 9,443,222 B2 | 9/2016 | Singel et al. |
| 9,448,610 B2 | 9/2016 | Davis et al. |
| 9,478,113 B2 | 10/2016 | Xie et al. |
| 9,582,696 B2 | 2/2017 | Barber et al. |
| 9,616,749 B2 | 4/2017 | Chamberlin |
| 9,618,993 B2 | 4/2017 | Murawski et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2002/0129139 A1* | 9/2002 | Ramesh .............. G06F 11/3495 709/224 |
| 2002/0171673 A1* | 11/2002 | Brown .................... G06Q 10/06 715/700 |
| 2004/0153664 A1* | 8/2004 | Rossler ............... G06F 21/6218 726/26 |
| 2004/0210464 A1* | 10/2004 | Belanger .......... G06Q 10/06398 705/7.42 |
| 2004/0243431 A1* | 12/2004 | Katz ...................... G06Q 10/10 455/405 |
| 2005/0071211 A1* | 3/2005 | Flockhart .......... G06Q 10/0631 379/266.03 |
| 2005/0278062 A1* | 12/2005 | Janert .................... G06Q 10/08 700/214 |
| 2005/0288948 A1* | 12/2005 | Devulapalli ........ G06Q 10/0639 705/7.38 |
| 2007/0063048 A1 | 3/2007 | Havens et al. |
| 2007/0080930 A1* | 4/2007 | Logan .................... G06Q 10/06 345/156 |
| 2008/0114638 A1* | 5/2008 | Colliau ............. G06Q 10/06314 705/7.19 |
| 2009/0006164 A1* | 1/2009 | Kaiser ............. G06Q 10/063112 705/7.14 |
| 2009/0048831 A1* | 2/2009 | Van Wagenen ......... H04L 67/08 704/235 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |

(56) References Cited

U.S. PATENT DOCUMENTS

| | | |
|---|---|---|
| 2012/0203647 A1 | 8/2012 | Smith |
| 2012/0223141 A1 | 9/2012 | Good et al. |
| 2012/0311585 A1* | 12/2012 | Gruber .................. H04W 4/02 |
| | | 718/100 |
| 2013/0030873 A1* | 1/2013 | Davidson ............... G06Q 10/06 |
| | | 705/7.36 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058801 A1* | 2/2014 | Deodhar ............. G06Q 10/0639 |
| | | 705/7.38 |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0188576 A1* | 7/2014 | de Oliveira ...... G06Q 10/06395 |
| | | 705/7.39 |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0229224 A1* | 8/2014 | Appel ............. G06Q 10/06315 |
| | | 705/7.25 |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | DiGregorio |
| 2014/0278391 A1 | 9/2014 | Braho et al. |
| 2014/0278823 A1* | 9/2014 | de Oliveira ............ G07C 5/008 |
| | | 705/7.38 |
| 2014/0278828 A1* | 9/2014 | Dorcas ............. G06Q 10/06398 |
| | | 705/7.42 |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |

(56) References Cited

U.S. PATENT DOCUMENTS

| | | |
|---|---|---|
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0064668 A1* | 3/2015 | Manci ............ G09B 5/00 434/219 |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142491 A1* | 5/2015 | Webb ............ G06Q 10/063114 705/7.15 |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0242918 A1* | 8/2015 | McCarthy ......... G06Q 30/0639 705/26.43 |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0092805 A1* | 3/2016 | Geisler ............ G06Q 10/0633 705/7.27 |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1* | 4/2016 | Raj ............... G06Q 10/06398 705/7.42 |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0189443 A1* | 6/2016 | Smith ............... G07C 5/02 701/29.1 |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2017/0039498 A1* | 2/2017 | Vasgaard ......... G06Q 10/06313 |

FOREIGN PATENT DOCUMENTS

| | | | |
|---|---|---|---|
| WO | 2013163789 A1 | 11/2013 | |
| WO | 2013173985 A1 | 11/2013 | |
| WO | 2014019130 A1 | 2/2014 | |
| WO | WO-2014059191 A2 * | 4/2014 | ....... G06Q 10/06398 |
| WO | 2014110495 A1 | 7/2014 | |

OTHER PUBLICATIONS

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al.); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System To Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

(56) References Cited

OTHER PUBLICATIONS

U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Patent Application for a Laser Scanning Module Employing an Elastomeric U-Hinge Based Laser Scanning Assembly, filed Feb. 7, 2012 (Feng et al.), U.S. Appl. No. 13/367,978.
U.S. Patent Application for Indicia Reader filed Apr. 1, 2015 (Huck), U.S. Appl. No. 14/676,109.

* cited by examiner

| WORKER | LOCATION-TO-LOCATION MOVEMENT | WORKER-TRAVEL TIMES DURING MEASUREMENT PERIOD (SECONDS) | | | | |
|---|---|---|---|---|---|---|
| | | 1 | 2 | 3 | 4 | 5 |
| WORKER1 | ab | 99 | 102 | 105 | 110 | — |
| | bc | 45 | 50 | — | — | — |
| | ac | 89 | — | — | — | — |
| WORKER2 | ab | 95 | 90 | 100 | — | — |
| | bc | 55 | 40 | 52 | 41 | 50 |
| | ac | 90 | 90 | 92 | 91 | — |
| WORKER3 | ab | 110 | 116 | — | — | — |
| | bc | 59 | — | — | — | — |
| | ac | 110 | 124 | — | — | — |

WORKER2-AVERAGE-TRAVEL TIME FOR LOCATION-TO-LOCATION MOVEMENT "AB" = 95

POPULATION-AVERAGE-TRAVEL TIME FOR LOCATION-TO-LOCATION MOVEMENT "AB" = 103

FIG. 4

SYSTEM AND METHOD FOR ASSESSING WORKER PERFORMANCE

FIELD OF THE INVENTION

The present invention relates to systems and methods for assessing worker performance and, more specifically, to determining travel-performance metrics for workers using voice-enabled mobile terminals in a warehouse setting.

BACKGROUND

The storage and movement of items in a warehouse is commonly managed by a warehouse management system (WMS). The WMS may create and manage warehouse work tasks (e.g., picking, stocking, etc.). In some cases, the WMS is interactive. As such, the WMS can guide workers through a workflow and detect errors in the process.

A WMS typically includes a plurality of mobile terminals in communication (e.g., wireless communication) with a centralized host computer. The mobile terminals may be worn or carried by a worker and used to facilitate warehouse work tasks, such as picking. For example, a mobile terminal may be used to scan barcodes on items that are gathered (i.e., picked) from storage locations for shipping. The mobile terminal may transmit the scanned data to the host computer, where WMS software running on the host computer receives the scanned data and logs the pick. Data from the host computer may also be transmitted to the mobile terminal. For example, after a pick is logged, the WMS software may assign a worker a new work task. A message regarding this work task may be transmitted from the host computer to the mobile terminal, which communicates the message to the worker.

One particularly efficient WMS utilizes voice-enabled mobile terminals to implement a voice-enabled workflow. The voice-enabled mobile terminals provide a speech interface between the host computer and the workers. A bi-directional communication via voice (i.e., a voice dialog) may be exchanged between the voice-enabled mobile terminal and the centralized host computer. Information transmitted by the host computer and received by a voice-enabled mobile terminal may be translated from text into voice prompts (e.g., questions, commands, instructions, statements, etc.) and transmitted to the worker via the voice-enabled mobile terminal's sound transducer (e.g., speaker). A worker may respond to a voice prompt by speaking a voice reply into the voice-enabled mobile terminal's microphone. In this way, voice-enabled workflow using voice-enabled mobile terminals provide an advantage over systems requiring other forms of workflow communication. Specifically, a voice-enabled workflow frees the worker's hands since no cumbersome equipment or paperwork is necessary to interact with the WMS.

Typically, the voice-enabled mobile terminal includes a headset worn by a worker. The voice-enabled mobile terminal also includes a mobile computing device (MCD). The MCD may be integrated within the headset or communicatively coupled to the headset and worn by the user (e.g., worn via a belt clip). The headset has a microphone for receiving voice sounds and a speaker for emitting voice prompts and sounds. Using the headset, a worker is able to receive voice instructions regarding assigned work tasks, ask questions, report the progress of work tasks, and report working conditions such as inventory shortages.

Workers may perform work tasks (e.g., picking) at different rates, and understanding a worker's voice-enabled workflow performance is important for optimizing the efficiency of a staff of workers. One traditional metric for measuring performance is the total number of work tasks completed in a shift (e.g., total number of picks). Unfortunately, this metric may be misleading. For example, a worker who works a longer shift will typically perform more picks than a worker who works a shorter shift. Here a better metric would seem to be a work-task rate (e.g., pick rate). Here again, however, this metric may be misleading. For example, if during a shift, a worker must repeatedly travel long distances on foot to pick various items, then the total number of items picked during the worker's shift may seem low compared to others. In general, properly assessing a worker's workflow performance is easily complicated by the particulars of the worker's work tasks and worker's environment. Therefore, a need exists for accurate and fair performance metrics to assess a worker's performance.

The time an exemplary warehouse-picking worker spends at work may be classified in three general ways: (i) time spent traveling, (ii) time spent picking, and (iii) time spent otherwise (e.g., breaks). Certain systems and methods for assessing worker performance by analyzing the worker's time spent picking are set forth in the commonly assigned U.S. patent application Ser. No. 14/880,482, and certain exemplary systems and methods for assessing by analyzing the worker's time spent otherwise are set forth in the commonly assigned U.S. patent application Ser. No. 14/861, 270 (Each of U.S. patent application Ser. Nos. 14/880,482 and 14/861,270 is hereby incorporated by reference in its entirety and not just to the extent that it discloses the aforementioned exemplary systems and methods). The present disclosure embraces assessing worker performance by analyzing the time spent travelling.

Comparing workers based on travel time can be difficult. For example, a worker may be assigned work tasks having long location-to-location distances. In this case, a long travel time may not imply poor performance. Knowledge of the worker's distance travelled could reveal this fact, but unfortunately, travel distances are typically not available in the data available for analysis (e.g., the worker's voice dialog). Further, creating detailed maps of a warehouse that correlate distances to location-to-location movements are not convenient since the warehouse environment may often change. Therefore, a need exists for an accurate and fair travel-performance metric to assess a worker's travel time performance (i.e., travel performance) derived from a voice-dialog in a voice-enabled workflow that is independent of the distance a worker travels.

SUMMARY

Accordingly, in one aspect, the present invention embraces a worker management system. The worker management system includes a plurality of voice-enabled mobile terminals that are used by a population of workers. Each worker in the population of workers uses a particular voice-enabled mobile terminal to participate in a voice dialog corresponding to the worker's work tasks. The system also includes a host computer that is in wireless communication with the voice-enabled mobile terminals. The host computer includes a processor that is configured by software to receive voice dialogs from the population of workers during a measurement period. The processor is also configured to analyze each worker's voice dialog to obtain worker-travel times for each worker's work tasks. Then, using the worker-travel times and a model retrieved from the host computer's memory, the processor is configured to compute a travel-performance metric for each worker. Finally, the processor is configured to assess the performance of a particular worker by comparing the travel-performance metric for the particular worker to the travel-performance metrics for other workers in the population of workers.

In an exemplary embodiment of the worker-management system, computing a travel-performance metric for each worker includes computing a travel-pick ratio, which is the ratio of the worker's total travel time to the worker's total number of picks.

In another exemplary embodiment of the worker-management system, computing a travel-performance metric for each worker includes computing a travel-work ratio, which is the ratio of a worker's total travel time to the worker's time spent otherwise.

In another exemplary embodiment of the worker-management system, computing a travel-performance metric for each worker includes computing an effective-travel ratio, which is the ratio of a worker's travel time that resulted in a pick to the worker's total travel time.

In another exemplary embodiment of the worker-management system, computing a travel-performance metric for each worker includes comparing a worker-average-travel time to a population-average-travel time for a location-to-location movement. In this embodiment, the worker-average-travel time is the average of the worker-travel times obtained from a worker for the location-to-location movement, and the population-average-travel time is the average of the worker-travel times obtained from all workers in the population of workers for the location-to-location movement.

In another exemplary embodiment of the worker-management system, computing a travel-performance metric for each worker includes comparing a worker-total-travel time to a population-total-travel time for a location-to-location movement. In this embodiment, the worker-total-travel time is computed by summing the worker-travel times obtained from a worker for a location-to-location movement. The population-total-travel time is computed by counting the number of times the worker performed the location-to-location movement, and then multiplying this count with the average of the worker-travel times obtained from all workers in the population of workers for the location-to-location movement.

In another exemplary embodiment of the worker-management system, the processor is further configured by software to create a voice message for a particular worker based on the performance assessment, and then transmit the voice message from the host computer to the particular worker's voice-enabled mobile terminal.

In another exemplary embodiment of the worker-management system, the worker-management system includes a display that is communicatively coupled to host computer for presenting reports and/or alerts based on the assessment. In one possible embodiment, these reports and/or alerts include a ranking of workers by travel-performance metric. In another possible embodiment, these reports and/or alerts include a message that a worker needs attention regarding the worker's performance.

In another exemplary embodiment of the worker-management system, the population of workers is a subset of all workers that performed work during the measurement period.

In another exemplary embodiment of the worker-management system, the processor is further configured by software to record the travel-performance metrics, computed for each worker during the measurement period, in a database that is stored in a computer-readable memory.

In another aspect, the present invention embraces a method for assessing a worker's performance in a voice-enabled workflow. The method begins with the step of receiving a voice dialog corresponding to a worker's voice-enabled workflow. Next, the dialog is analyzed to obtain worker-travel times for each location-to-location movement performed by the worker during a measurement period. These steps (i.e., the steps of receiving and analyzing) are repeated to obtain worker-travel times for each worker in a population of workers. After the worker-travel times are obtained, a population-average-travel time for each location-to-location movement is created. The population-average-travel time for a particular location-to-location movement is the average of all worker-travel times obtained from the population of workers for the particular location-to-location movement. Next, using the worker-travel times and the population-average-travel times, a travel-performance metric is calculated for each worker. Finally, a worker's performance is assessed by comparing the worker's travel-performance metric to the travel-performance metrics for other workers in the population of workers.

In an exemplary embodiment of the method, the step of calculating a travel-performance metric for each worker includes computing, for each worker, the average difference between worker-average-travel times and population-average-travel-times for all location-to-location movements. In this case, a worker's worker-average-travel time for a particular location-to-location movement is the average of the worker's worker-travel times obtained for the particular location-to-location movement.

In another exemplary embodiment of the method, the step of calculating a travel-performance metric for each worker includes several steps. First, a worker-total-travel time is created for each location-to-location movement and for each worker. Here, the worker-total-travel time for a particular location-to-location movement is the sum of the worker's worker-travel times obtained for the particular location-to-location movement. Next, the number of times each location-to-location movement was performed by each worker is counted. Then, a population-total-travel time is created for each worker and for each location-to-location movement. In this case, a worker's population-total-travel time for a particular location-to-location movement is the number of times the particular location-to-location movement was performed by the worker multiplied by the population-average-travel time for the particular location-to-location movement. Finally, the travel-performance metric for each worker is calculated as the difference between the sum of the worker-total-travel times for all location-to-location movements and the sum of the population-total-travel times for all location-to-location movements divided by the total number of location-to-location movements performed by the worker during the measurement period.

In another exemplary embodiment of the method, the step of assessing the worker's performance includes combining the travel-performance metric with other performance metrics to generate a new performance metric.

In another exemplary embodiment of the method, the step of assessing the worker's voice-enabled workflow performance includes ranking workers in the population of workers by their travel-performance metric and determining the worker's performance by the worker's rank.

In another exemplary embodiment of the method, the step of assessing the worker's performance includes comparing the travel-performance metric for a worker obtained during the measurement period to a travel-performance metric for the worker obtained during a different measurement period.

In another exemplary embodiment of the method, the method further includes the steps of generating a graphical report, including the results of the assessment, and transmitting the graphical report to a computing device with a display for displaying the graphical report.

In another exemplary embodiment of the method, the method further includes the step of adjusting the work tasks assigned to a worker based on the assessment of the worker's performance.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 4 graphically illustrates the computation of a worker-average-travel time and a population-average-travel time according to an embodiment of the present invention.

DETAILED DESCRIPTION

The present invention embraces a system and a method for assessing a worker's performance in a voice-enabled workflow for a logistics operation (e.g., a warehouse). A worker's time spent traveling from location-to-location during work is a significant portion of the worker's total work time. As a result, an analysis of a worker's travel time is important for assessing a worker's performance.

A worker that performs work tasks (e.g., picking, stocking, etc.) in a voice-enabled workflow creates a voice dialog. The voice dialog contains data (e.g., times, locations, quantities, work-task type, etc.) corresponding to the worker's assigned work tasks (e.g., picking, stocking, etc.). As a result, the voice dialog from a worker may be recorded during a measurement period and then analyzed to create a travel-performance metric summarizing a worker's travel performance (e.g., speed, efficiency, accuracy, etc.).

A travel-performance metric is typically a single numerical value (e.g., a positive or negative number) representing the worker's performance relative to some group and/or time. For example, a travel-performance metric may represent the worker's performance relative to a particular group of workers (i.e., population) during a particular time (i.e., measurement period).

A worker's performance may be assessed by comparing the worker's travel-performance metric to travel-performance metrics of other workers and/or from other measurement periods. Various comparisons of may be made. In one example, a worker's travel-performance may be compared to the travel-performance metric of other workers in a population of workers for a particular measurement period. In another example, a worker's travel-performance from one measurement period may be compared to the same worker's travel-performance metric from another measurement period (or periods). Likewise, the metrics of a group of workers may be compared to the metrics of other groups of workers (e.g., different shifts of workers, different locations, etc.). In addition, trends and/or variations of a worker's (or group's) metrics over time may be derived. Other possible metric comparisons exist (e.g., between groups, individuals, measurement periods, work tasks, etc.) and are all within the scope of the present disclosure.

Figure 1:
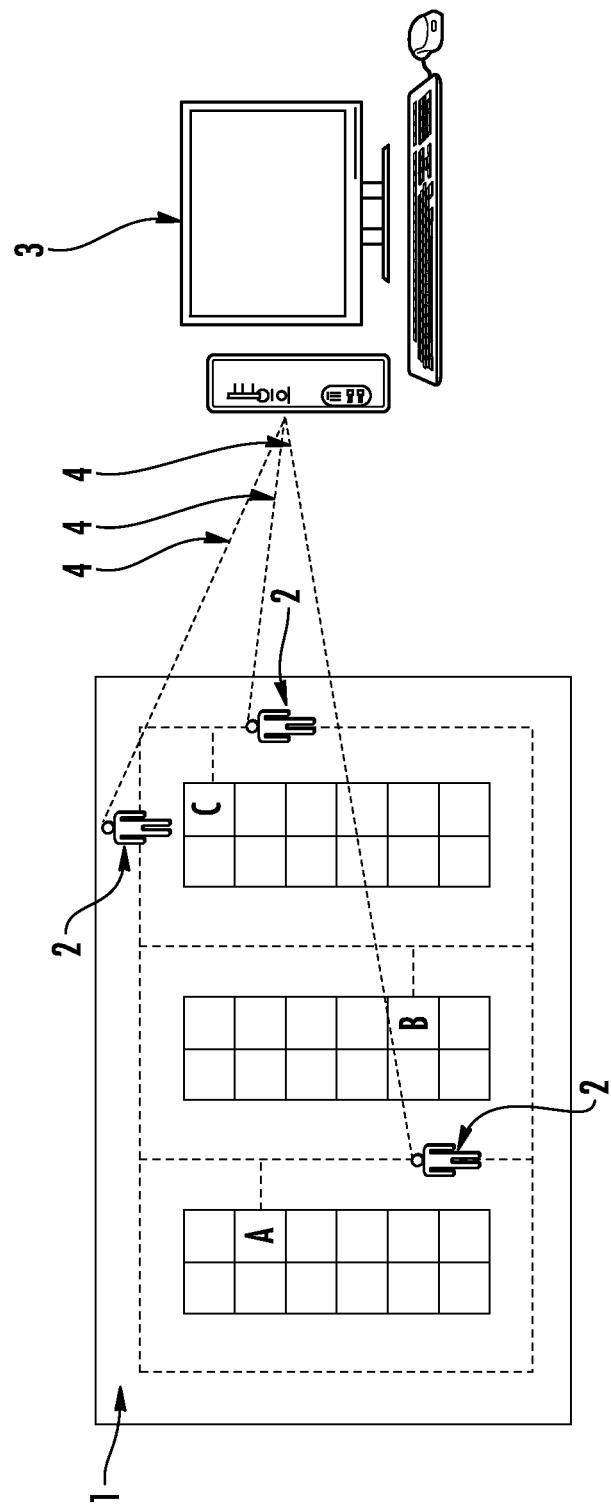
FIG. 1 graphically illustrates an exemplary implementation of a work management system in an exemplary warehouse according to an embodiment of the present invention.

As means of example, FIG. 1 graphically depicts workers 2 operating in an exemplary warehouse 1. The workers 2 wear and use voice-enabled mobile terminals to wirelessly communicate (via voice prompts and responses) to a host computer 3 running software to manage the voice-enabled workflow.

The workers 2 in the warehouse, shown in FIG. 1, participate in a voice dialog to facilitate work tasks. As mentioned, the voice dialog typically includes the prompts generated by the host computer 3 and responses uttered by the worker 2. By way of example, consider the following exemplary portion of a voice dialog corresponding to FIG. 1:

Mobile Terminal: "Go to room 1, aisle 2, slot 2" (i.e., location "A");
Worker: "331" (i.e., check-digit to confirm location);
Mobile Terminal: "Pick two.";
Worker: "Two" (i.e., confirms pick task);
Mobile Terminal: "Go to aisle 3, slot 5" (i.e., location "B");
Worker: "225";
Mobile Terminal: "Pick three.";
Worker: "3";
Mobile Terminal: "Go to aisle 4, slot 1" (i.e., location "C").

The host computer may save to memory the voice dialog collected over some period of time (e.g., as UTF-8 alphanumeric text strings). Software running on the host computer may configure the host computer's processor to isolate the relevant portions of the voice dialog by identifying key words or phrases relating to work tasks. For example, in the above exemplary voice dialog, each captured expression can be uniquely identified and parsed into its constituent components, including (but not limited to) the following information:

The locations to which the user was directed;
The travel time between locations, as calculated by the time between the current travel prompt (e.g., "Go to aisle 3, slot 5) and the user-spoken check-digit (e.g., "225"); and
The time at the slot, as calculated by the time from the spoken check-digit (e.g., "225") to the completion of the task (e.g., "3").

The voice dialog, including this information, may be stored in a computer readable memory (e.g., the host computer's memory) for later analysis or re-analysis.

The host computer 3 may be one or more, computers having software stored thereon. The host computer 3 may be any of a variety of different computers, including both client and server computers working together and including databases and/or systems necessary to interface with multiple voice-enabled mobile terminals. The host computer 3 may be located at one facility or may be distributed at geographically distinct facilities. Furthermore, the host computer 3 may include a proxy server. Therefore, the host computer 3 is not limited in scope to a specific configuration.

The host computer 3 may run one or more software programs for handling a particular task or set of tasks, such as inventory and warehouse management systems (which are available in various commercial forms). The host computer 3 may include a Warehouse Management System (WMS), a database, and a web application to facilitate the voice enabled workflow. The host computer 3 may also include software for programming and managing the individual voice-directed mobile terminals, as well as the software for analyzing the performance of workers.

Figure 2:
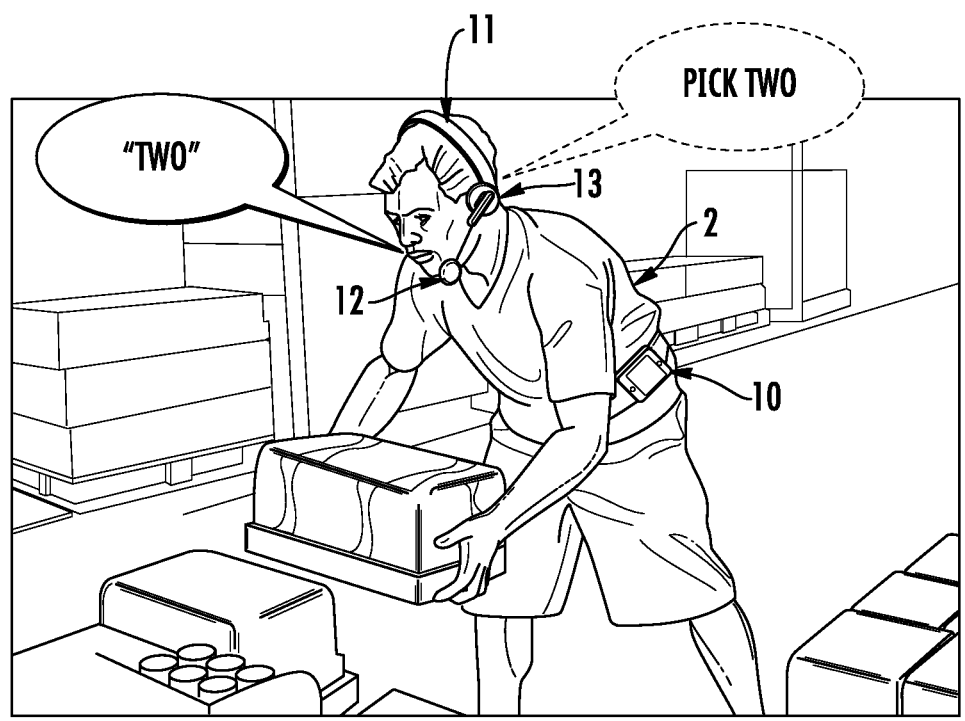
FIG. 2 graphically depicts an exemplary implementation of a voice-enabled mobile terminal according to an embodiment of the present invention.

FIG. 2 graphically depicts an implementation of a voice-enabled mobile terminal used in accordance with the voice-enabled workflow according an embodiment of the present disclosure. The voice-directed mobile terminal may be worn by a worker 2 or other user/operator (e.g. manager, supervisor, etc.), thereby allowing for hands-free operation. The voice-enabled mobile terminal typically includes a mobile computing device 10 and a headset 11. The mobile computing device 10 may be worn (e.g., on a belt) or otherwise used as part of a worker's normal work process (e.g., incorporated with a tool, a vehicle, or a device that the worker uses during work). The use of the descriptive term "terminal" is not limiting and may include any similar computer, device, machine, smartphone, smartwatch, indicia reader, or system. Therefore, the exact form of the voice-directed mobile terminal utilized to practice the present systems and methods is not limited to the embodiment shown in FIG. 2.

The headset 11, as shown in FIG. 2, serves as the worker's interface. The mobile computing device 10 may be communicatively coupled with the headset 11 or may be incorporated into the body of the headset 11. When separate, the headset 11 may be coupled to the mobile computing device 10 with a cord or via a wireless communication link (e.g., BLUETOOTH™). The headset 11 is worn (i.e., on the worker's head) and includes a microphone 12 for receiving the worker's voice. A headset speaker 13 transmits voice prompts (e.g., commands, instructions, descriptions, etc.) to the worker. The voice-enabled mobile terminal thus facilitates a voice dialog between the worker 2 and the host computer 3 to enable voice-directed movement throughout a warehouse or other facility.

The mobile computing device 10 may include the processing and memory necessary to convert the voice signals from the worker into data (e.g., UTF-8 alphanumeric text strings) suitable for transmission over a network (e.g., using speech-recognition software) and to convert the data received over a network into voice signals (e.g., using text-to-speech software). In some cases, the mobile computing device 10 may allow a worker 2 to perform a workflow without communication with a host computer 3. Therefore, various aspects of the present disclosure might be handled using voice-enabled mobile terminals only. Usually, however, the host computer 3 is desirable due to the complexity of voice-enabled workflow.

Each voice-enabled mobile terminal may communicate with the host computer 3 using a wireless communication link 4. The wireless communication link may use an appropriate wireless communication protocol (e.g., 802.11b/g/n, HTTP, TCP/IP, etc.) and may use one or more wireless access points that are coupled to the host computer 3 and accessed by the voice-directed mobile terminal.

Figure 3:
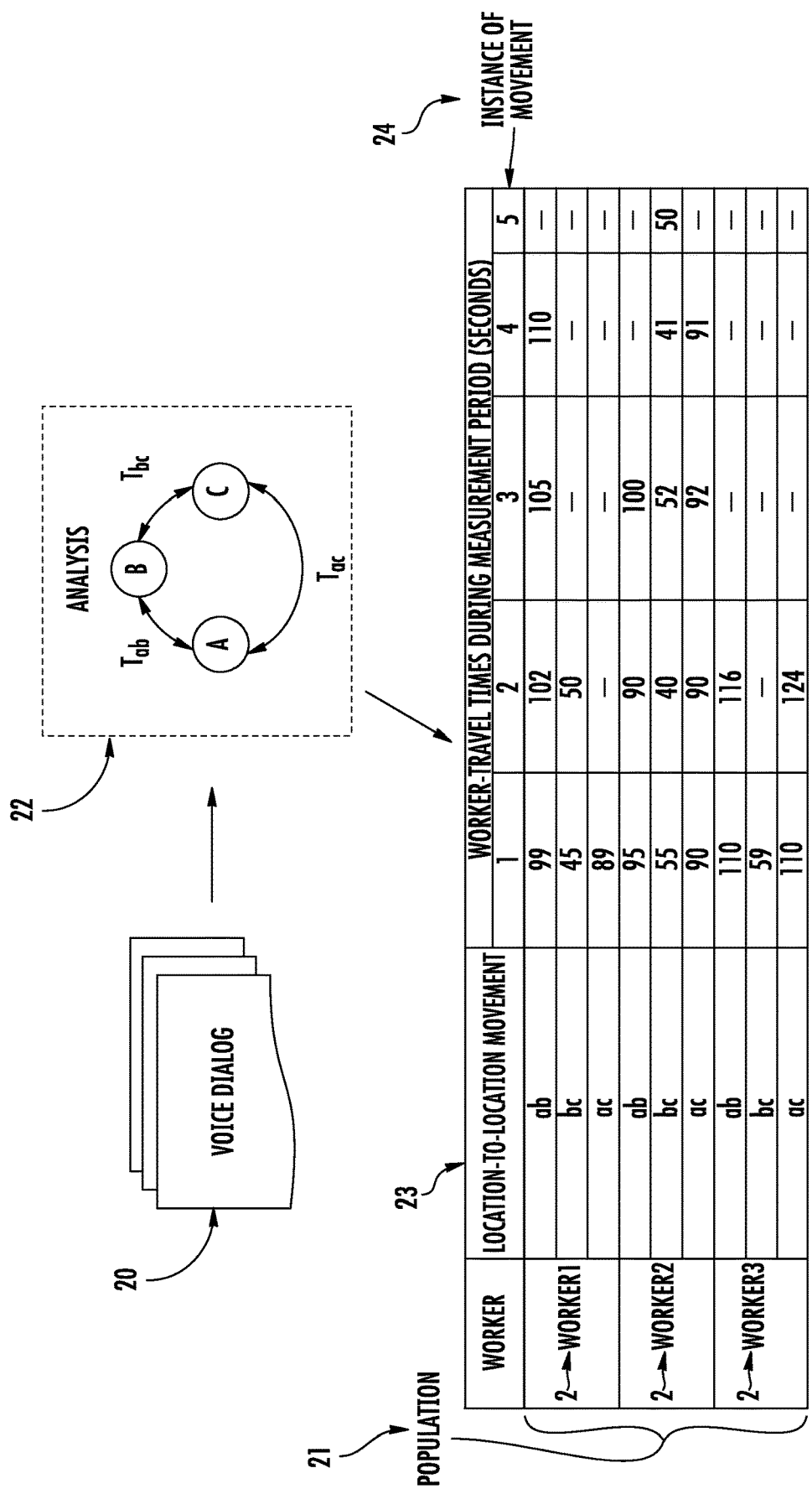
FIG. 3 graphically illustrates an exemplary process to obtain worker-travel times for an exemplary voice-enabled workflow according to an embodiment of the present invention.

By way of example, consider the voice-enable workflow as shown in FIG. 1. The voice dialogs 20 corresponding to a worker's 2 voice-enabled workflow are forwarded to the host computer 3 where they are stored for analysis. After a measurement period, the voice-dialogs, as shown in FIG. 3, are analyzed by software algorithms running on the host computer to isolate those portions of the voice dialog relating to location-to-location movements. The algorithms typically isolate the relevant portions of workflow dialog by identifying key words or phrases relating to location-to-location movement (e.g., travel prompts, check-digits, etc.). Since the keywords or phrases in the voice dialogs are recorded with timestamps (e.g., using a clock in the host computer or voice-enabled mobile terminal), worker-travel times for location-to-location movements may be obtained. FIG. 3 illustrates this process for a population of three workers moving within an environment (e.g., warehouse) having three exemplary locations: A, B, and C. The voice dialogs 20 from a population of workers 21 are analyzed 22 to obtain the times each worker (i.e., worker1, worker2, and worker3) took to perform each location-to-location movement (i.e., ab, bc, and ac). These worker-travel times are recorded (e.g., in a database) 23 for each worker (i.e., worker1, worker2, and worker3) and for each instance that the worker performed the movement 24.

It will be appreciated by a person of ordinary skill in the art that, although exemplary embodiments presented herein incorporate voice-enabled workflow, the present disclosure is not limited to voice. The present disclosure embraces any terminal that facilitates a dialog between a computer and a worker (e.g., speech, text, gestures, etc.).

The software running on the host computer use the worker-travel times, for a population of workers obtained during a measurement period, to compute a travel-performance metric for each worker. The travel-performance metric quantifies the worker's performance (e.g., speed, efficiency, etc.) in travelling to complete the worker's assigned work tasks. It is also possible to compute, from the dialog, the number of times a particular work task was completed during the measurement period. For example, how many times a particular location-to-location movement was performed or how many times a work-task was performed (e.g., number of picks).

Different travel-performance metrics may be used to assess a worker's performance. For example, in one embodiment the travel-performance metric is a travel-pick ratio (TPR) as shown below:

$$TPR_{worker, period} = \frac{(\text{Travel\_Time})_{total}}{(\#of \text{ Picks})_{total}}$$

The TPR is the ratio of the worker's total travel time to the worker's total number of picks.

In another embodiment, the travel performance metric is a travel-work ratio (TWR) as shown below:

$$TWR_{worker, period} = \frac{(\text{Travel\_Time})_{total}}{(\text{Other\_Time})_{total}}$$

The TWR is the ratio of a worker's total travel time to the worker's time spent otherwise.

In another embodiment, the travel performance metric is an effective-travel ratio (ETR) as shown below:

$$ETR_{worker, period} = \frac{(Travel\_Time)_{pick}}{(Travel\_Time)_{total}}$$

The ETR is the ratio of a worker's travel time that resulted in a pick to the worker's total travel time.

In some embodiments, it may be necessary to compute more than one travel-performance metric to assess a worker's performance fairly and accurately. In these cases, it may be useful to combine the computed metrics. For example, a weighted sum or average of performance metrics may be used to generate a new performance metric (i.e., a fused-performance metric). In another example, a ratio of metrics may be used to generate a new performance metric.

In many cases, it is important to assess a worker-performance using a travel-performance metric that is independent of the distance that a worker travels. This helps avoids confusion since each worker may be assigned different work tasks and since each worker may take different routes to travel from location-to-location. Since a worker may perform many movements during a measurement period (e.g., a work shift), the time-variations resulting from a worker's different routes may be averaged to compute a fair travel-performance metric. In addition, a travel-performance metric may be computed by comparing a worker's travel times for movements only to other workers that performed the same movements in order to make a fair comparison. In addition, a travel performance metric may be computed by comparing a worker's travel times for movements to an equivalent time that a population would be expected to perform the same movements. In these ways, the worker's time to perform a long distance movement is not unfairly compared to times taken to perform short distance movements (i.e., distance independent). A distance-independent (i.e., travel-pattern based) travel-performance metric may be computed in a variety of ways.

In one embodiment, the travel-performance metric is computed by comparing (i) a worker's average time taken to perform a location-to-location movement with (ii) the average time that the population of workers took to perform the same location-to-location movement.

In this embodiment, the location-to-location worker-travel times for a measurement period are obtained from the voice dialog (e.g., as shown in FIG. 3). Next, for each location-to-location movement a population-average-travel time is computed (i.e., $Tpop_{loci,locj}$). The population-average-travel time is the average time that all workers in the population took to perform a location-to-location movement (during the measurement period). This average time includes the times from all workers and from each instance that a particular worker performed the location-to-location movement. Next, for a worker the worker-average-travel time is computed for each location-to-location movement (i.e., $Tworker_{loci,locj}$). The worker-average-travel time for a particular location-to-location movement is the average time that a worker took to perform the location-to-location movement (during the measurement period).

By way of example, FIG. 4 illustrates which data is used to compute the population-average-travel time and the worker-average-travel time for a particular worker (i.e., "Worker2") and a particular location-to-location movement (i.e., "ab").

A travel-performance metric (i.e., TPM) for a worker may be computed by averaging the differences between the worker-average-travel time and the population-average-travel time for all location-to-location travels as shown below.

$$TPM_{worker} = \text{Average}(Tpop_{loci,locj} - Tworker_{loci,locj})_{all\ loci,locj}$$

In another embodiment, the travel-performance metric may be computed by comparing (i) a worker's total time spent performing location-to-location movements with (ii) the total time that the population of workers would be expected to perform the same location-to-location movements.

As before, the location-to-location worker-travel times for a measurement period are obtained from the voice dialog (e.g., as shown in FIG. 3). For each location-to-location movement a population-average-travel time is computed (i.e., $Tpop_{loci,locj}$). Then, for a worker the worker-total-travel time is computed for each location-to-location movement (i.e., $TOTworker_{loci,locj}$). The worker-total-travel time for a particular location-to-location movement is the total time (i.e., sum of the worker-travel times) that the worker took to perform the location-to-location movement. Next, the number of times that the worker performed the location-to-location movement is recorded (i.e., $N_{loci,locj}$). Then, using the population-average-travel time and the number of times each location-to-location movement was perform, a corresponding population-total-travel time (i.e., $TOTpop_{loci,locj}$) is computed for each location-to-location movement as shown below.

$$TOTpop_{loci,locj} = N_{loci,locj} \times Tpop_{loci,locj}$$

Figure 5:
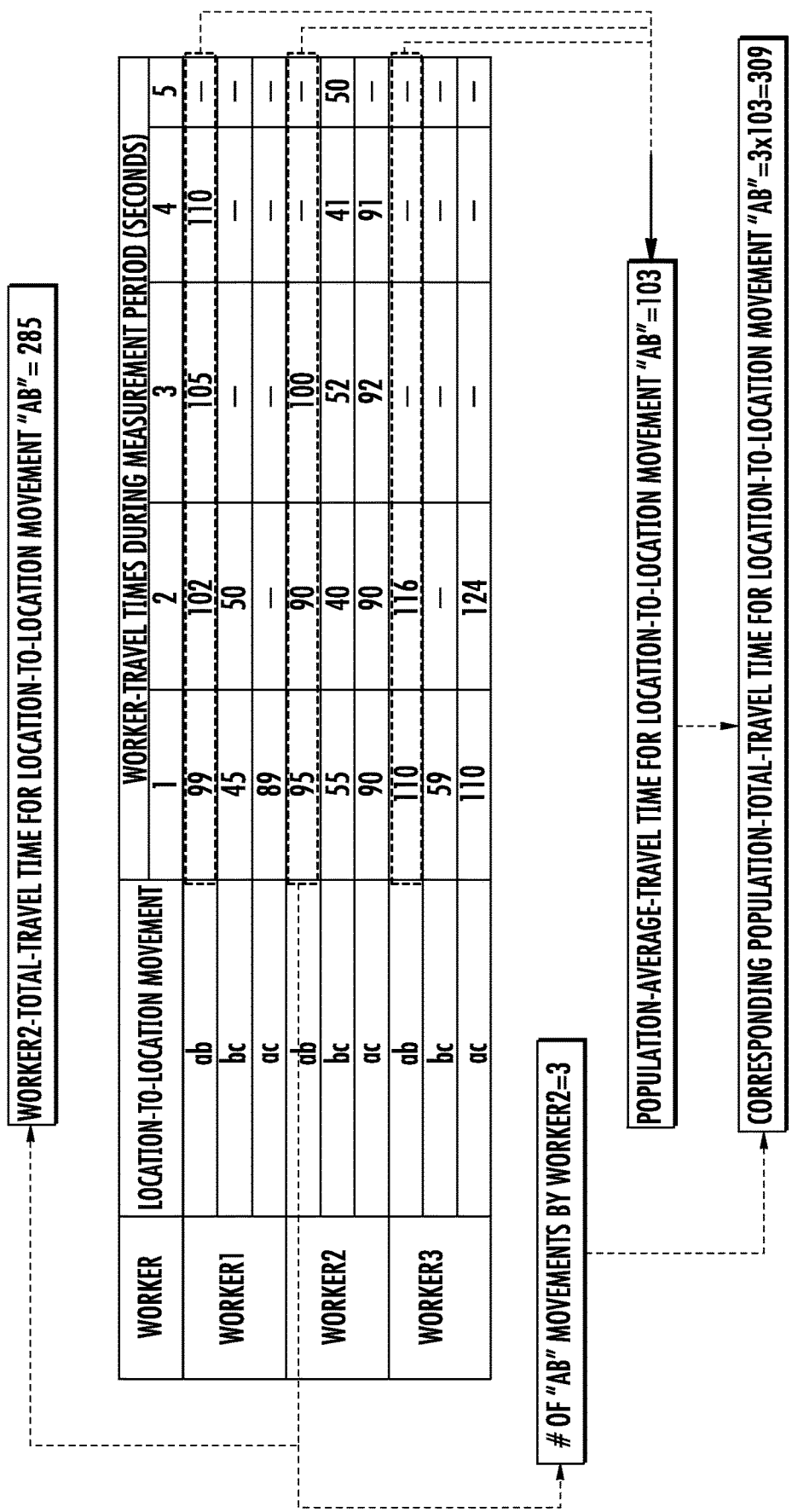
FIG. 5 graphically illustrates the computation of a worker-total-travel time and a population-total-travel time according to an embodiment of the present invention.

By way of example, FIG. 5 illustrates which data is used to compute the population-total-travel time and the worker-total-travel time for a particular worker (i.e., "Worker2") and a particular location-to-location movement (i.e., "ab").

A travel-performance metric (i.e., TPM) for a worker may be computed as the difference between the worker-total-travel time and the population-total-travel time divided by the total number of movements performed by the worker for all location-to-location travels as shown below.

$$TPM_{worker} = \frac{\left(\sum_{all\ loci,locj} TOT_{pop_{loci,locj}} - \sum_{all\ loci,locj} TOT_{worker_{loci,locj}}\right)}{\sum_{all\ loci,locj} N_{loci,locj}}$$

The performance of a particular worker may be assessed by comparing the travel-performance metric for a particular worker to the travel-performance metrics of other workers. For example, workers in a population of workers may be ranked by their performance metric. In this case, a worker's performance may be assessed by their rank or other grouping (e.g., quartile). In some cases, a fused ranking may be created from the combination of the ranks of different performance metrics. For example, a fused ranking may be generated through a weighted sum of the rankings of different performance metrics.

Figure 6:
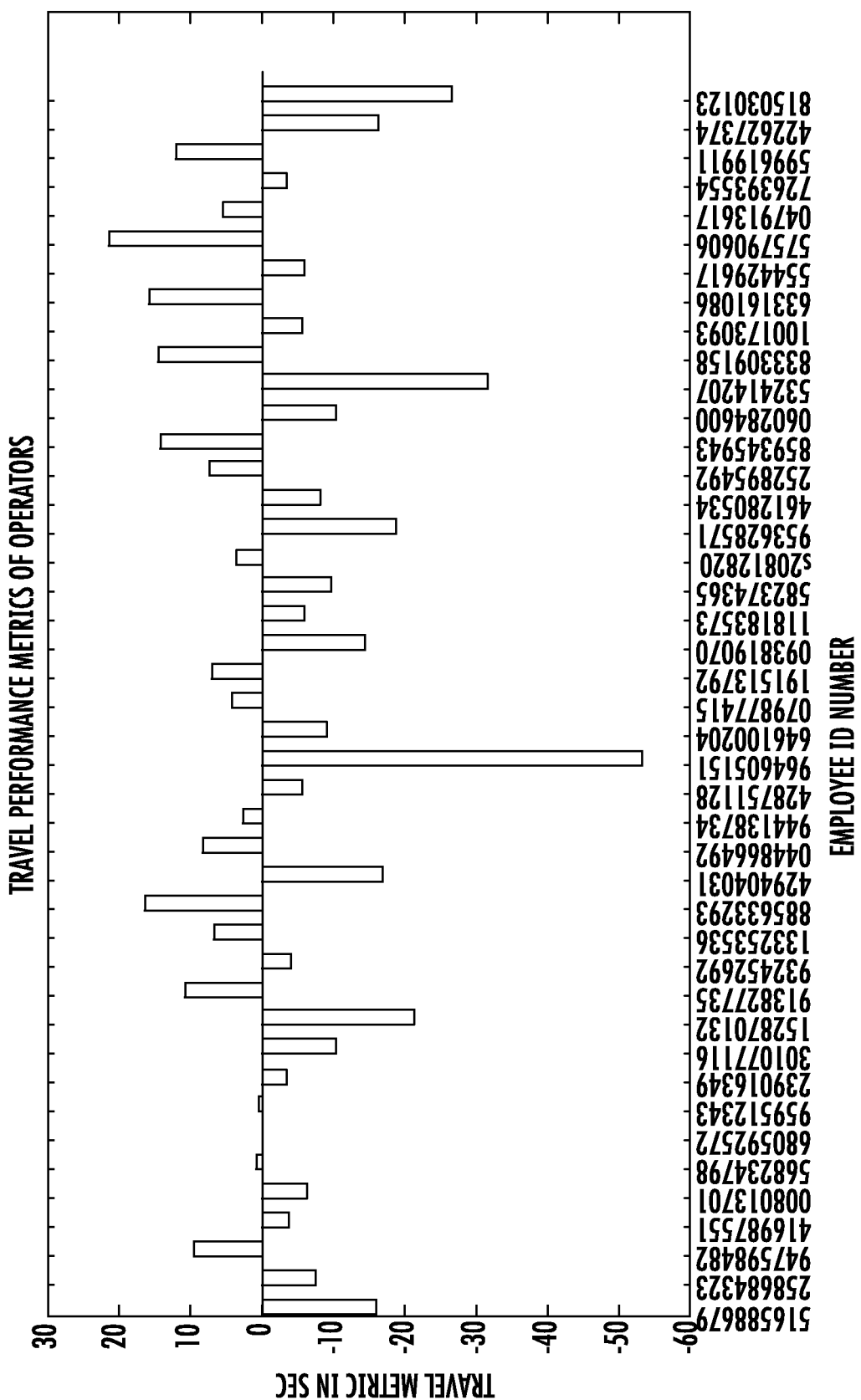
FIG. 6 graphically depicts and exemplary report of travel-performance metrics for a population of workers according to an embodiment of the present invention.

Graphical reports may be created based on a worker's travel-performance metric and/or the assessment of the worker's performance (e.g., the worker's rank). FIG. 6 illustrates an exemplary report of worker's travel-performance metrics. Here, workers are identified on the X-axis by number while the vertical axis displays each worker's travel-performance metric. Various reports (e.g., tables, graphs, charts, etc.) and various views (e.g., bar graphs, pie charts, etc.) of each report are envisioned by the present disclosure, and not limited to the example shown in FIG. 6. The graphical reports may be generated for view on a computing device (e.g., computer, smartphone, tablet, etc.) with a display.

Alerts may be created based on a worker's travel-performance metric and/or the assessment of the worker's performance (e.g., the worker's rank). These alerts may include messages presented or sent to a particular worker (e.g., a supervisor) and are typically intended to generate a response. For example, an alert message may be sent (e.g., text message, email message) to a supervisor stating that a worker needs attention (e.g., additional training, discipline, encouragement, etc.) as a result of the worker's performance. In another example, a voice message may be communicated directly to the worker (via the worker's voice-enabled mobile terminal), based on the worker's performance.

The travel-performance metrics and/or the reports/alerts may be stored in a database on a computer-readable readable memory for future viewing and/or future use (e.g., for comparison with performance metrics created in the future). The data in the database may be filtered to generate various reports (e.g., by worker/group, by measurement period, by movement, by location, by item picked etc.).

Filtering by measurement period enables the assessment performance by weekday, weekend, weekly, monthly, and specific dates (e.g., before a major holiday). For example, workers who work on weekday may be compared against those who work on weekend. In another example, a worker's performance may be assessed weekly or monthly. In still another example, a worker's performance during a period of high demand may be compared to periods having normal work conditions.

Filtering by worker/group also enables the assessment of performance by aspects of the worker/group. For example, a group may include workers of a particular experience level or workers using a particular language.

Filtering by location also enables the assessment of worker performance based aspects of the location. For example, a particular location-to-location route may be compared with other routes.

Filtering by item may enable the assessment of worker performance based on aspects of an item picked. These aspects may include items that are bulk, palletized, or packaged in containers.

In some embodiments, actions may be taken based on the performance of a worker. For example, the work tasks that are assigned to a worker may be based on the assessed performance of the worker. If a worker's travel performance is low, for example, then the worker may only be assigned short location-to-location movements.

To supplement the present disclosure, this application incorporates entirely by reference the following commonly assigned patents, patent application publications, and patent applications:
U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;

U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;

U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A worker-management system, comprising:
 a host computer located in a first facility and in wireless communication with a voice-enabled mobile terminal comprising a headset worn by a worker, wherein the host computer manages the voice-enabled mobile terminal facilitating a voice dialog between the worker and the host computer to enable voice-directed movement throughout a second facility, wherein the host computer includes a processor configured by software to:
 (i) receive, from a wireless communication link, electronic audio communication data corresponding to a voice dialog recorded with timestamps during a measurement period from a microphone of the voice-enabled mobile terminal;
 (ii) process the electronic audio communication data to determine the voice dialog;
 (iii) parse, utilizing speech-recognition, at least a first portion of the voice dialog to identify a first keyword or a first phrase and identify at least a first constituent component indicating a first location where the worker is located based at least in part on identification of the first keyword or the first phrase;
 (iv) identify a second constituent component comprising a first timestamp associated with a travel prompt provided via the voice-enabled mobile terminal, wherein the travel prompt directs the worker to a second location;
 (v) parse, utilizing speech-recognition, at least a second portion of the voice dialog to isolate a relevant portion of the voice dialog by at least identifying, utilizing speech-recognition, a second keyword or a second phrase indicating the worker has moved to the second location, and identify from the relevant portion a third constituent component comprising a second timestamp based on identification of the second keyword or the second phrase;
 (vi) programmatically calculate the worker-travel time based at least in part on the first timestamp and the second timestamp;
 (vii) based at least in part on the worker-travel time from the first location to the second location and a model retrieved from the host computer's memory, programmatically compute travel-performance metrics for the worker, wherein the travel-performance metrics corresponds to a travel-to-pick ratio, a travel-work ratio, and an effective-travel ratio,
 (viii) assign ranks to each of the travel-performance metrics of the worker, wherein the ranks associated with the different travel-performance metrics are combined to create a fused rank,
 (ix) assess a performance of the worker using the fused rank of the worker,
 (x) based on the travel-performance metrics and the assessed performance using the fused rank of the worker, the processor is further configured to:
 generate, via a display, a graphical report comprising filters to sort data represented in the graphical report, and
 generate, via the voice-enabled mobile terminal, an alert comprising a voice prompt to the worker.

2. The worker-management system according to claim 1, wherein computing the travel-performance metrics for each of the worker comprises:
 computing the worker-total-travel time for all of the worker's work tasks; and
 computing the travel-pick ratio that is the ratio of the worker-total-travel time to a total number of the worker's work tasks.

3. The worker-management system according to claim 1, wherein computing the travel-performance metric for the worker comprises:
 computing the travel-work ratio that is the ratio of the worker-total-travel time to the worker time spent otherwise.

4. The worker-management system according to claim 1, wherein computing the travel-performance metrics for the worker comprises:
 computing the effective-travel ratio that is the ratio of the worker-travel time that resulted in a pick to the worker-total-travel time.

5. The worker-management system according to claim 1, wherein the processor is further configured by software to:
 create a voice message for the worker based on the performance assessment; and
 transmit the voice message from the host computer to the worker's voice-enabled mobile terminal.

6. The worker-management system according to claim 1, the host computer is further configured to:
 store, in at least one database, the worker-travel time associated with data indicating movement from the first location to the second location,
 wherein the travel-performance metrics of the worker is determined based at least in part on at least one other worker-travel times corresponding to at least one other worker and retrieved from the at least one database based at least in part on the data indicating movement from the first location to the second location.

7. The worker-management system according to claim 1, wherein to identify the second constituent component comprising the first timestamp associated with the travel prompt, the host computer is configured to:
parse, utilizing speech recognition, at least a third portion of the voice dialog to identify a third keyword or a third phrase and identify the second constituent component based at least in part on identification of the third keyword or the third phrase.

8. The worker-management system according to claim 1, wherein computing the travel-performance metrics for the worker comprises:
receiving data from a wireless communication link representing voice dialogs from a plurality of workers associated with voice-enabled mobile terminals in the second facility during the measurement period;
assessing the performance of the worker by comparing the travel-performance metric for the worker to another travel-performance metric for another worker;
computing a worker-average-travel time that is an average of the worker-travel time obtained from the worker for the location-to-location movement;
computing a population-average-travel time that is an average of the worker-travel time obtained from all workers in a population of workers for the location-to-location movement; and
comparing the worker-average-travel time to the population-average-travel time.

9. The worker-management system according to claim 8, wherein computing the travel-performance metrics for the worker comprises:
computing the worker-total-travel time that is a sum of the worker-travel time obtained from the worker for the location-to-location movement;
counting number of times the worker performed the location-to-location movement;
computing the population-total-travel time that is the average of the worker-travel time obtained from all workers in the population of workers for the location-to-location movement multiplied by the number of times the worker performed the location-to-location movement; and
comparing the worker-total-travel time to the population-total-travel time.

10. The worker-management system according to claim 8, wherein the population of workers is a subset of all workers that performed work during the measurement period.

11. The worker-management system according to claim 8, further comprising:
the display communicatively coupled to the host computer for presenting reports and/or alerts based on the assessment.

12. The worker-management system according to claim 11, wherein the reports and/or alerts include the ranking of workers by the travel-performance metrics.

13. The worker-management system according to claim 11, wherein the reports and/or alerts include a message that the worker needs attention regarding worker's performance.

14. A method for assessing a worker's performance in a voice-enabled workflow, the method comprising the steps of:
receiving, from a wireless communication link, at a host computer in a first facility, electronic audio communication data corresponding to a voice dialog recorded with timestamps during a measurement period from a microphone of a voice-enabled mobile terminal in a second facility;
processing the electronic audio communication data to determine the voice dialog;
parsing, utilizing speech-recognition, at least a first portion of the voice dialog to identify a first keyword or a first phrase and identify at least a first constituent component indicating a first location where the worker is located based at least in part on identification of the first keyword or the first phrase;
identifying a second constituent component comprising a first timestamp associated with a travel prompt provided via the voice-enabled mobile terminal, wherein the travel prompt directs the worker to a second location;
parse, utilizing speech-recognition, at least a second portion of the voice dialog to isolate a relevant portion of the voice dialog by at least identifying, utilizing speech-recognition, a second keyword or a second phrase associated with a first location-to-location movement indicating the worker has moved to the second location, and identify from the relevant portion a third constituent component comprising a second timestamp based on identification of the second keyword or the second phrase;
programmatically calculate the worker-travel time based at least in part on the first timestamp and the second timestamp;
repeating the steps of receiving and analyzing to obtain the worker-travel time for each other in a population of workers;
creating a population-average-travel time for each location-to-location movement, wherein the population-average-travel time for a particular location-to-location movement is the average of all worker-travel time obtained from the population of workers for the particular location-to-location movement;
calculating, using the worker-travel time and the population-average-travel time, travel-performance metrics for each worker, wherein the travel-performance metrics corresponds to a travel-to-pick ratio, a travel-work ratio, and an effective-travel ratio;
assigning ranks to each of the travel-performance metrics of each worker, wherein the ranks associated with the different travel-performance metrics are combined to create a fused rank;
assessing a performance of the worker using the fused rank of the worker; and
based on the travel-performance metrics and the assessed performance using the fused rank of the worker,
generating, via a display, a graphical report comprising filters to sort data represented in the graphical report, and
generating, via the voice-enabled mobile terminal, an alert comprising a voice prompt to the worker.

15. The method according to claim 14, wherein the step of calculating the travel-performance metric for each worker comprises:
computing a worker-average-travel time that is an average of the worker-travel time obtained from the worker for the particular location-to-location movement;

computing the average difference between the worker-average-travel time and the population-average-travel-time for all location-to-location movements.

16. The method according to claim 14, wherein the step of calculating the travel-performance metric for each worker comprises:
    creating the worker-total-travel time for each location-to-location movement, wherein the worker-total-travel time for a particular location-to-location movement is the sum of the worker's worker-travel time obtained for the particular location-to-location movement;
    counting, number of times each location-to-location movement was performed;
    creating a population-total-travel time for each location-to-location movement, wherein a worker's population-total-travel time for a particular location-to-location movement is the number of times the particular location-to-location movement was performed by the worker multiplied by the population-average-travel time for the particular location-to-location movement; and
    calculating the travel-performance metrics as the difference between the sum of the worker-total-travel time for all location-to-location movement and the sum of the population-total-travel time for all location-to-location movement divided by the total number of location-to-location movement performed by the worker during the measurement period.

17. The method according to claim 14, further comprises:
    receiving, at the host computer in the first facility, plurality of voice dialogs corresponding to plurality of workers voice-enabled workflow;
    assessing the worker's performance by comparing the worker's travel-performance metric to the travel-performance metrics for other workers in the population of workers; and
    combining the worker's travel-performance metrics with other performance metrics to generate a new performance metric.

18. The method according to claim 17, wherein the step of assessing the worker's performance comprises:
    comparing the travel-performance metric for a worker obtained during the measurement period to a travel-performance metrics for the worker obtained during a different measurement period.

19. The method according to claim 17, further comprising the steps of:
    generating the graphical report comprising the results of the assessment; and
    transmitting the graphical report to a computing device, wherein the computing device comprises the display for displaying the graphical report.

20. The method according to claim 17, further comprising the step of:
    adjusting the work tasks assigned to a worker based on the assessment of the worker's performance.

* * * * *